United States Patent [19]

Nobunaga

[11] Patent Number: 4,868,648
[45] Date of Patent: Sep. 19, 1989

[54] METHOD AND APPARATUS FOR INSPECTING A PIPELINE IN ORDER TO DETERMINE ECCENTRICITY THEREOF

[75] Inventor: Hiroshi Nobunaga, Soka, Japan

[73] Assignee: Kabushiki Kaisha Iseki Kaihatsu Koki, Tokyo, Japan

[21] Appl. No.: 234,426

[22] Filed: Aug. 19, 1988

[51] Int. Cl.⁴ .............................................. H04N 7/18
[52] U.S. Cl. ..................................... 358/100; 358/93; 358/107
[58] Field of Search ................. 358/100, 107, 93, 108; 378/60

[56] References Cited

U.S. PATENT DOCUMENTS 3,783,189  1/1974  Nelson ............................. 358/100 X
4,616,258  10/1986  Ono et al. ............................ 358/100
4,654,702  3/1987  Tolino et al. ....................... 358/100

Primary Examiner—James J. Groody
Assistant Examiner—Victor R. Kostak
Attorney, Agent, or Firm—Mattern, Ware, Stoltz & Fressola

[57] ABSTRACT

A system for inspecting a pipeline in order to determine eccentricity thereof comprises the steps of directing a beam from one end of the pipeline to the other end, disposing a detecting means, which is provided with a light receiving body having a light receiving surface for receiving the beam and a television camera for taking a picture of the light receiving body, in the pipeline so as to be moved along the axis of the pipeline, processing an output signal of the television camera while maintaining the position of the light receiving body to have a predetermined relationship to the inner surface of the pipeline and determining whether or not the pipeline is eccentric on the basis of the result of said processing step.

10 Claims, 12 Drawing Sheets

FIG. 12
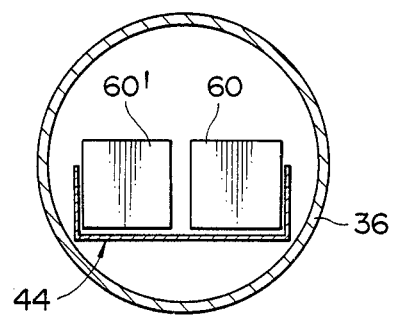
FIG. 13(A)　　FIG. 13(B)
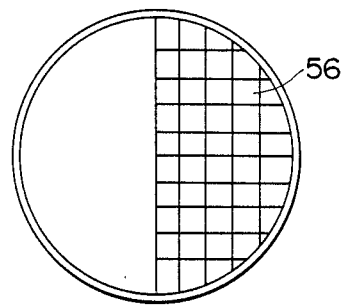 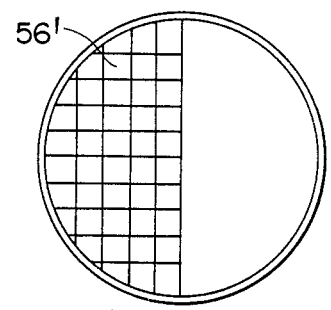

METHOD AND APPARATUS FOR INSPECTING A PIPELINE IN ORDER TO DETERMINE ECCENTRICITY THEREOF

BACKGROUND OF THE INVENTION

1. Field of the Invention

This invention relates to a method for inspecting a pipeline such as a sewer pipe and a tunnel in order to determine eccentricity thereof, and an apparatus embodying the same and, more particularly, to a method for inspecting a pipeline, which can be seen through from one end thereof to the other, and an apparatus embodying the same.

2. Description of the Prior Art

An existing pipeline or newly laid pipeline needs to be inspected in a plurality of longitudinal portions as to whether or not the pipeline is eccentric. This inspective operation can be carried out by an ordinary leveling method if the pipeline to be inspected is such a large bore pipeline, as an operator can enter. In the case of a small-bore pipeline such as a sewer pipe, however, the inspective operation as noted above cannot be carried out because the operator cannot enter such a small-bore pipeline.

SUMMARY OF THE INVENTION

An object of the present invention is to provide a method for inspecting a pipeline and an apparatus embodying the same, in which an operator can determine whether or not the pipeline is eccentric without entering the interior of the pipeline.

A method for inspecting a the pipeline in order to determine eccentricity thereof, according to the present invention comprises the steps of directing a beam from one end of the pipeline to the other, disposing a detecting means, which is provided with a light receiving body having a light receiving surface for receiving the beam and a television camera for taking a picture of the light receiving body, in the pipeline so as to be movable in the axial direction of the pipeline, processing an output signal of the television camera while maintaining the position of the light receiving body to have a predetermined relationship to the inner surface of the pipeline, and determining whether or not the pipeline is eccentric on the basis of the result of the processing step.

An apparatus according to the present invention, which utilizes a beam directed from one end of a pipeline to the other to determine whether or not pipeline is eccentric, comprises detecting means disposed in the pipeline so as to be movable in the axial direction of the pipeline and provided with a light receiving body having a light receiving surface for receiving the beam, a mechanism for releasably maintaining the position of the light receiving body relative to the inner surface of the pipeline so that the light receiving body has a predetermined relationship to the inner surface of the pipeline and a television camera for taking a picture of the light receiving body and means for processing an output signal of the television camera to determine whether or not the pipeline is eccentric.

According to the present invention, since the detecting means is disposed at a predetermined position in the pipeline to determine whether or not the pipeline is eccentric at the predetermined position on the basis of the output signal of the television camera, an operator can determine inspect whether or not the pipeline is eccentric without entering the interior of the pipeline.

Also, according to the present invention, since the position of the light receiving body relative to the inner surface of the pipeline is maintained so that the inner surface has a predetermined positional relationship to the light receiving body when inspection is done, it is possible to accurately determine whether or not the pipeline is eccentric.

BRIEF DESCRIPTION OF THE DRAWINGS

The foregoing and other objects and features of the invention will become apparent from the following description of a preferred embodiment of the invention with reference to the accompanying drawings, in which:

FIG. 12 is a view showing a television camera and a frame of the detecting device shown in FIG. 11;

FIG. 13 is a view showing the light receiving plate used in the detecting device shown in FIG. 11;

DETAILED DESCRIPTION OF THE PREFERRED EMBODIMENT

Figure 1:
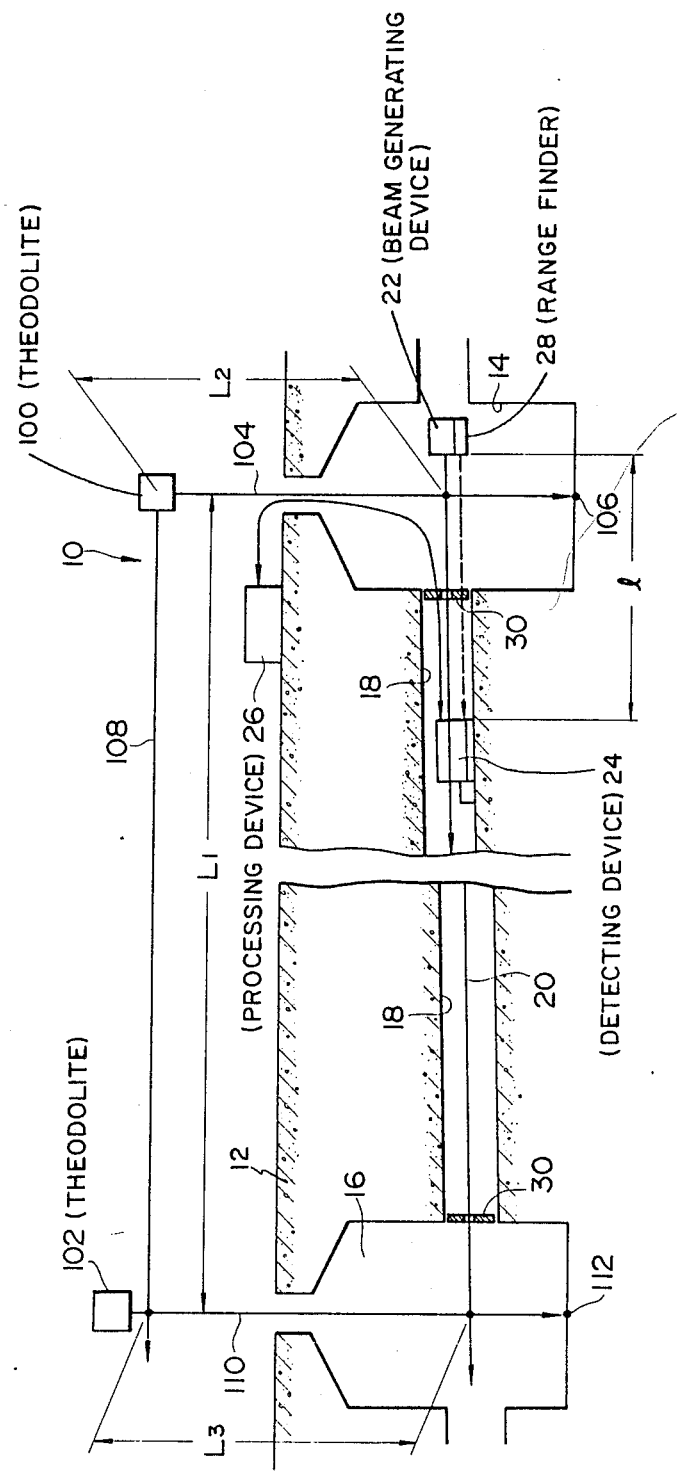
FIG. 1 is a schematic view showing an embodiment of an inspection apparatus according to the present invention.

An inspection apparatus 10 shown in FIG. 1 is used for measuring eccentricities at a plurality of longitudinal spots of a pipeline 18 affording communication between two manholes 14, 16 constructed in the ground 12 to determine whether or not the pipeline is eccentric on the basis of the measured value. The section of the pipeline 18 is circular.

The inspection apparatus 10 comprises a beam generating device 22 for generating a beam 20 directed from the manhole 14 to the manhole 16 through the pipeline 18, a detecting device 24 disposed in the pipeline 18 and adapted for receiving the beam 20 to generate information corresponding to a light receiving portion, a processing device 26 for processing an output signal of the detecting device and a well-known range finder 28 such as a light wave range finder for measuring a distance 1 between the manhole 14 and the light receiving portion.

The beam generating device 22 is provided with a beam generator for generating a fine spot beam 20 such as a laser beam. The beam generating device 22 is also installed in the manhole 14 so that the beam 20 is directed from the center of a manhole 14-side end of the pipeline 18 to the center of a manhole 16-side end of the pipeline 18. In order to install the beam generating device 22 in such a manner, a circular slit may be provided respectively in the centers of two disks 30 and the respective disks 30 may be disposed at the ends of the pipeline 18. Then, the beam generating device 22 may be fixed to a position which is selected so that the beam 20 passes through the slits of both disks 30. Both disks 30 are removed when the eccentricity is measured.

Since the beam 20 is directed from the center of the manhole 14-side end of the pipeline 18 to the center of the manhole 16-side end thereof, the beam 20 is used for a reference line adapted for measuring the radial deviation of the pipeline 18. However, the beam to be used does not need to pass along the center axis of the pipeline 18, but may pass through portions spaced from the center axis of the pipeline 18 by a predetermined distance.

Figure 2:
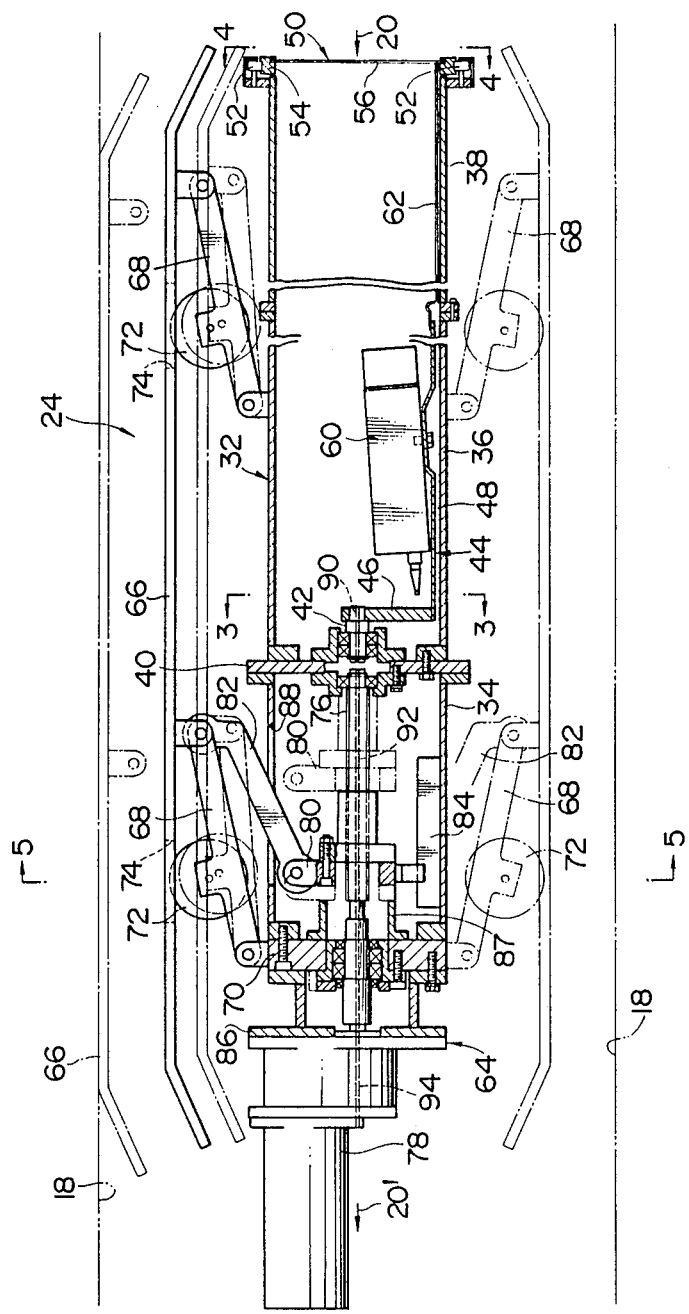
FIG. 2 is a longitudinal sectional view showing an embodiment of a detecting device used in the inspection apparatus according to the present invention.

As shown in FIG. 2, the detecting device 24 comprises a casing 32 provided with three sections, i.e., tubular bodies 34,36,38 connected in series to each other and aligned with each other. The tubular bodies 34,36 sandwiching a disk-like wall 40 therebetween are connected to each other by a plurality of bolts and the tubular bodies 36,38 are connected to each other by a plurality of bolts. A hole is bored in the central portion of the wall 40. The wall 40 has a shaft 42 extending along the axis of casing 32 and which is rotatably supported about the axis of the casing 32 while being supported coaxially with the casing 32.

Figure 3:
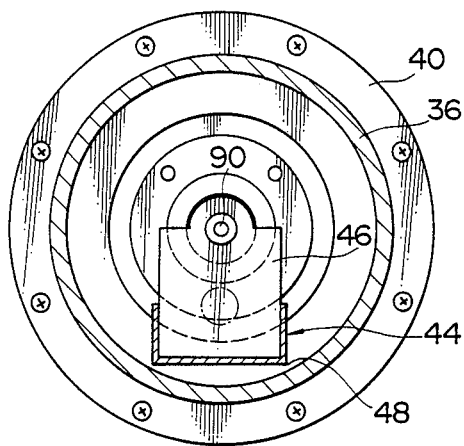
FIG. 3 is a sectional view taken along the line 3—3 in FIG. 2.

As shown in FIGS. 2 and 3, the detecting device 24 also comprises a frame 44 disposed in the tubular body 36. The frame 44 has a plate-like portion 46 and a portion 48 having a U-shaped section and is fixed to the shaft 42 at the portion 46 so that the portion 46 extends in parallel to the wall 40 at the wall 40-side and the portion 48 extends from the wall 40 to the tubular body 38 in the tubular body 36. Thus, the frame 44 can be rotated about the axis of the casing 32.

Figure 4:
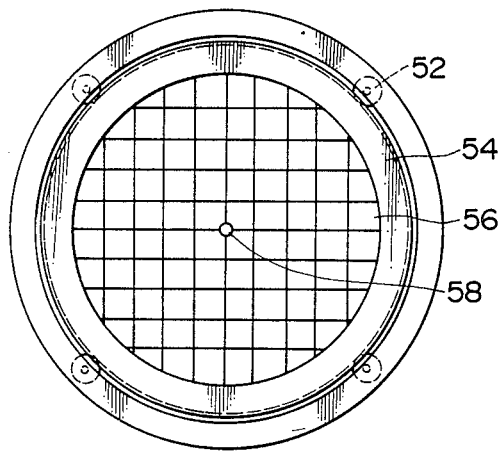
FIG. 4 is an end view taken along the line 4—4 in FIG. 2.

On an end of the portion 38 opposite to the portion 36, a circular light receiving body 50 is rotatably supported about the axis of the casing 32 within a plane orthogonal to the axis of the casing 32. The light receiving body 50 is provided with a ring 54 rotatably supported by a plurality of rollers 52 in the portion 38 and a disk-like light receiving plate 56 fixed to the ring 54 and made of a translucent material. As shown in FIG. 4, a latticed pattern is drawn on one surface of the light receiving plate 56. A hole 58 smaller than the spot of the beam 20 is bored in the center of the light receiving plate 56. The ring 54 and light receiving plate 56 are disposed in such a manner that the center of the light receiving plate 56 always coincides with the axis of the casing 32 even if the light receiving body 50 is rotated angularly relative to the casing 32.

On the portion 48 of the frame 44 there is installed a television camera 60 for taking or picking up a picture of the back of the light receiving plate 56. The output signal of the television camera 60 is supplied to the processing device 26 installed on the ground. The frame 44 and light receiving body 50 are interconnected by a connecting piece 62 without changing the mutual positional relationship between the light receiving surface of the light receiving plate 56 and the television camera 60.

Figure 5:
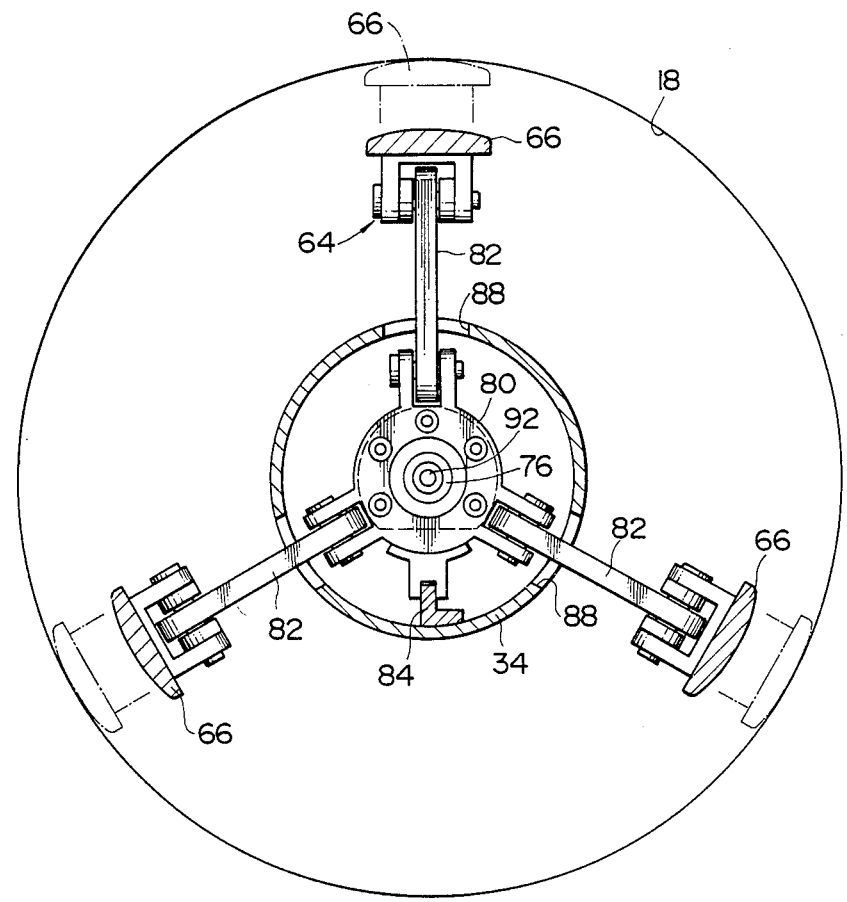
FIG. 5 is a sectional view taken along the line 5—5 in FIG. 2.
Figure 6:
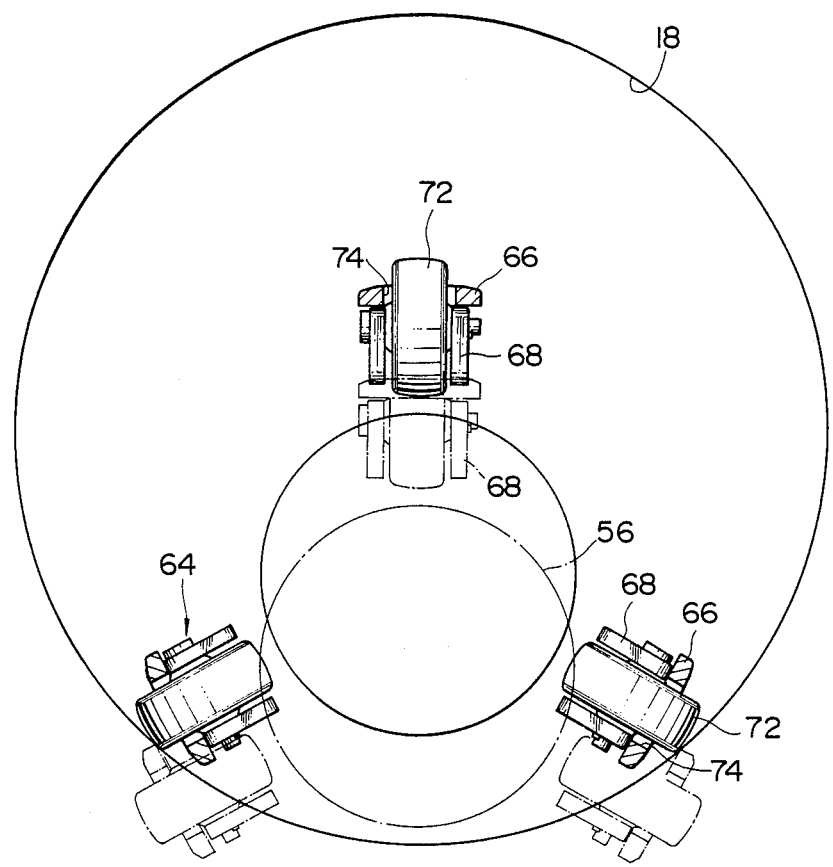
FIG. 6 is a view for explaining the positional relationship among an elongate member, a wheel and a pipeline when a maintaining mechanism is contracted.

As shown in FIGS. 2, 5 and 6, the detecting device 24 is also provided with a maintaining mechanism 64 for releasably fixing the light receiving body 50 and inner surface of the pipeline 18 so as to keep a predetermined positional relationship therebetween. The maintaining mechanism 64 is provided with a plurality (three in the example shown) of elongate members 66 pressed against the inner surface of the pipeline 18 so as to make the center of the light receiving plate 56 coincide with the axis of the pipeline 18. Each elongate member 66 extends along the axis of the casing 32 outside the casing and is connected to the casing 32 by a pair of parallel links 68 so that a position of the elongate member on a straight line extending radially of the casing 32 is variable. One of the pair of links 68 is connected to the casing 32 through a disk-like bed seat 70 fixed to the casing 32 at the side opposite to the light receiving body 50 and the other link 68 is connected directly to the casing 32. The elongate members 66 are disposed around the casing 32 at equal angular intervals.

On each link 68 is mounted a wheel 72 and each elongate member 66 is formed with a hole 74 for allowing a portion of the wheel 72 to project outside the elongate member 66 when the elongate member approaches the casing 32. Further, a plurality of wheels 72 may be mounted on each elongate member 66.

Also, the maintaining mechanism 64 comprises a drive mechanism for pushing the elongate members 66 toward the inner surface of the pipeline 18. The drive mechanism is provided with a screw rod 76 rotatable around the axis of the casing 32, a drive source 78 for rotating the screw rod 76, a slider 80 threadingly engaging the screw rod 76 and a link 82 for interconnecting the slider 80 and elongate member 66 with each other. The screw rod 76 is supported by the wall 40 and the bed seat 70 so as to be coaxial with the casing 32. The drive source 78 is provided with a rotational source such as a motor and a reduction gear connected to an output shaft thereof. The drive source 78 is mounted on the casing 32 through the bed seat 70 by a mounting base 86.

The slider 80 is allowed to move along the axis of the casing 32 by a guide 84 fixed to the casing 32, but blocked from the rotation about the axis of the casing 32. Thus, the slider 80 is moved along the axis of the casing 32 by the rotation of the screw rod 76, so that the angle of the link 82 with respect to the axis of the casing 32 is varied. As a result, the position of the elongate member 66 is changed radially of the casing 32. The position of the slider 80 retreating toward the bed seat 70 is restricted by a stopper 87 mounted on the bed seat 70. Further, a slot 88 for the link 82 is bored in the tubular body 34 of the casing 32.

Further, the drive mechanism may use a shaft, a piston-cylinder device and a slider supported movably along the axis of the shaft respectively, in place of the screw rod 76, drive source 78 and slider 80. In this case, the link 68 is connected to the slider and then the slider is moved by the piston-cylinder device.

The shaft 42, screw rod 76 and drive mechanism 78 are formed respectively in portions coincident with the axis of the casing 32 with holes 90,92,94 smaller than the spot of the beam 20 and penetrating in the axial direction of the casing 32.

The processing device 26 is provided with a cathode ray tube, such as a television receiver i.e., monitor, for projecting or reproducing the image of the light receiving plate 56 on the basis of the output signal of the television camera 60; a processing circuit for calculating a distance, between the center of that light receiving plate 56 and the portion of the light receiving plate which is irradiated by the beam 20 i.e. eccentricity and the inclination $\theta$ of the beam 20 from the beam generating device 22; and a memory for storing the eccentricity together with a distance signal from the range finder 28.

When inspection is done, distances $L_1, L_2, L_3$ shown in FIG. 1 are first measured. These measurements are carried out after theodolites 100,102 are disposed respectively above the manholes 14,16 to adjust the positions of both theodolites 100,102 so that a vertical beam 104 from the theodolite 100 is irradiated on a mark 106 premarked on the bottom of the manhole 14 after the vertical beam 104 crosses the beam 20 from the beam generating device 22 while a vertical beam 110 from the theodelite 102 is irradiated on a mark 112 premarked on the bottom of the manhole 16 after the vertical beam 110 crosses a horizontal beam 108 from the theodolite 100 and the beam 20 from the beam generating device 22.

The measured distances $L_1, L_2, L_3$ are inputted to the processing device 26. In the processing device 26, distances are used for the following calculation;

tan $\theta = (L_3 - L_2) \div L_l$ in order to obtain the inclination 0 of the beam 20 from the beam generating device 22. The measured distances $L_1, L_2, L_3$ and obtained inclination 0 are stored in the memory of processing device.

After the measurements of the distances $L_1, L_2, L_3$ are done, the disk 30 is removed and a wire for moving the detecting device 24 along the pipeline 18 is mounted on the detecting device 24. Thus, the detecting device 24 is disposed in the pipeline 18 so that the light receiving body 50 is located at the beam generating device 22-side.

When the detecting device 24 is disposed in the pipeline 18, the slider 80 is moved to the wall 40 by actuating the drive source 78 and then the elongate member 66 is pressed against the inner surface of the pipeline 18. Thus, since the axes of the casing 32 and light receiving plate 56 are aligned with the center of the pipeline 18, the beam 20 is irradiated on the center of the light receiving plate 56 and a partial beam 20' of the beam 20 passes through the holes 58,90,92 and 94 and then reaches the manhole 16. When the partial beam 20' reaches the manhole 16, it can be confirmed that the beam generating device 22 and detecting device 24 are correctly disposed.

Next, the detecting device 24 is moved from the manhole 14 to the manhole 16 or vice versa after the slider 80 is moved to the bed seat 70. As shown in FIG. 2, since the slider 80 is moved to the bed seat 70 during the movement of the detecting device 24, the wheel 72 of the link 68 connected to the pair of elongate members 66 contacts the inner surface of the pipeline 18. Therefore, the detecting device 24 moves smoothly. The moving distance of the detecting device 24 is measured by the range finder 28 and the measured value is supplied to the processing device 26.

When the detecting device 24 is moved by a predetermined distance, the detecting device 24 is stopped to carry out a process of measuring the eccentricity of the pipeline 18 in the stopping position. When the measuring process is done, the slider 80 is moved to the wall 40 by actuating the drive source 78 and then each elongate member 66 is pressed against the inner surface of the pipeline 18. Thus, the axes of the casing 32 and light receiving plate 56 are aligned with the center of the pipeline 18 in the stopping position of the detecting device 24, i.e., in the measuring position.

When the pipeline 18 is not eccentric in the measuring position, the beam 20 is irradiated on the center of the light receiving plate 56, so that the center of the light receiving plate 56 has the light intensity higher than that of the other portions thereof. A part of the beam irradiated on the center of the light receiving plate 56 passes through the holes 58,90,92 and 94 and then reaches the manhole 16. Thus, when the partial beam 20' reaches the manhole 16, it can be confirmed that the pipeline 18 is not eccentric at the stopping position of the detecting device.

On the other hand, when the pipeline 18 is eccentric in the measuring position, the beam 20 is irradiated on a spot offset from the center of the light receiving plate 56, so that the irradiated portion has the light intensity higher than that of the other spots. Also, the beam 20 irradiated on the light receiving plate 56 does not pass through the holes 58,90,92 and 94. Thus, since the beam does not reach the manhole 16, it can be confirmed that the pipeline 18 is eccentric at the stopping position of the detecting device 24.

The television camera 60 takes a picture of the light receiving plate 56 to transmit the output signal to the processing device 26. The monitor of the processing device 26 projects the image of the light receiving plate 56. When the pipeline 18 is not eccentric at the measuring position, the center of a display surface of the monitor has a high light intensity or high brightness. On the other hand, when the pipeline 18 is eccentric at the measuring position, the spot offset from the center of the display surface of the monitor by the eccentricity of the pipeline 18 has the high light intensity or high brightness. Therefore, it can be confirmed whether or not the pipeline 18 is eccentric by monitoring the display surface of the monitor.

The processing device 26 calculates the eccentricity of the pipeline 18 in the measuring position through the processing circuit on the basis of the output signal of the television camera 60, and the calculated eccentricity is stored in the memory together with the distance signal from the range finder 28. The eccentricity, for example, can be calculated by obtaining the coordinates of a portion of the light receiving plate 56 irradiated by the beam 20 in the X,Y cordinates of the light receiving plate 56 having the center as origin.

Since the distance between lattices of the light receiving plate 56 is known, the eccentricity can be obtained by actually or visually measuring on the monitor the distance between the center of the latticed pattern on the monitor and the position with the high light intensity and then by multiplying the measured value by the magnification of the monitor.

By repeating the process of drawing back the slider 80 to the bed seat 70 to advance the detecting device 24 by a predetermined distance and the process of measuring the eccentricity, an operator can measure the eccentricity of the pipeline 18 without entering the inside of the pipeline 18. Further, it is possible to find the eccentric direction of the pipeline if the pipeline is eccentric.

According to the inspection apparatus 10, the elongate members 66 are pressed against the inner surface of the pipeline 18 when the measurement is done so that the center of the light receiving plate 56 coincides with the center of the pipeline 18 in any measuring positions and thus the eccentricity can be accurately measured. Also, since the frame 44 is angularly rotated in the direction opposite to the rotational direction of the casing 32 relative to the casing 32 about the axis of the casing 32 so that the television camera 60 is located below by the weights of the frame 44 and television camera 60, even if the detecting device 24 is angularly rotated about the axis of the casing 32 relative to the pipeline 18, the orientations of the light receiving plate 56 and television camera 60 relative to the pipeline 18, i.e., the positional relationships among the pipeline, plate 56 and camera 60 in the vertical and horizontal directions are always constant. Accordingly, the eccentricity of the pipeline can be measured more accurately.

Figure 14:
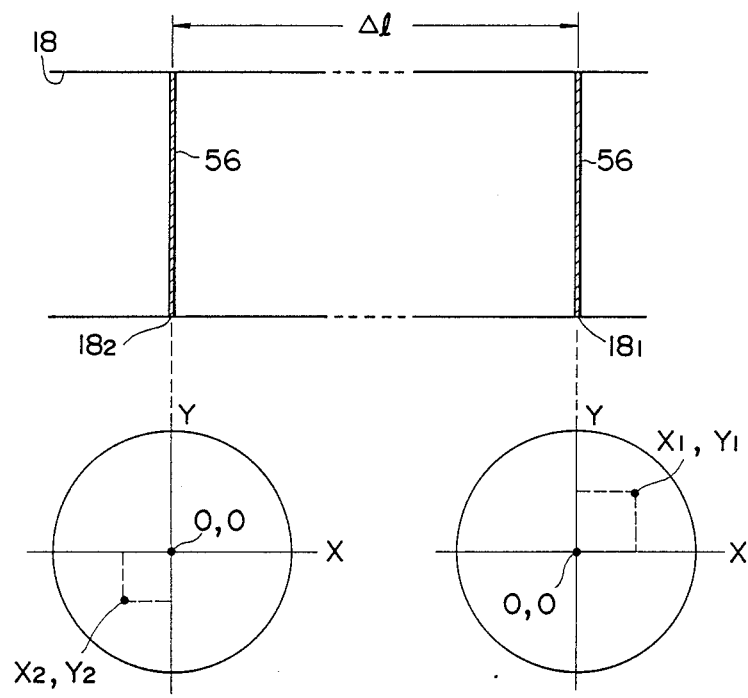
FIG. 14 is a view for explaining a method of calculating the inclination of a pipeline portion between positions to be measured.

The inspection apparatus 10 can obtain the inclination of a pipeline section between first and second measuring positions from the measured values in the first measuring position and the second measuring position, to which the detecting device 24 is moved from the first measuring position by a predetermined distance Namely, as shown in FIG. 14, assuming that coordinate values of that portion of the light receiving plate 56 which is irradiated by the beam 20 in the first measuring position $18_1$ are $X_1,Y_1$ and the coordinate values of that portion of the light receiving plate 56 which is irradiated by the beam 20 in the second measuring position $18_2$ spaced from the first measuring position $18_1$ are $X_2,Y_2$, the inclination $\theta x$ in the horizontal direction (X axis direction) and the inclination $\theta y$ in the vertical direction (Y axis direction) can be obtained from the following formulas;

$\tan \theta x = (X_1 - X_2)/\Delta l$ $\tan \theta y = (Y_1 - Y_2)/\Delta l$

Figure 7:
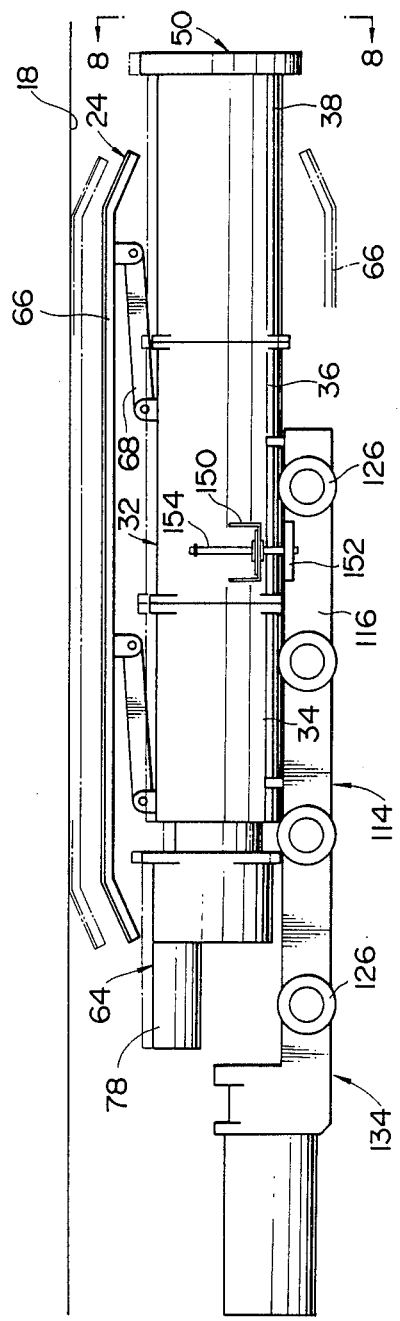
FIG. 7 is a front view showing the inspection apparatus having the detecting device shown in FIG. 2 and mounted on a carriage.
Figure 8:
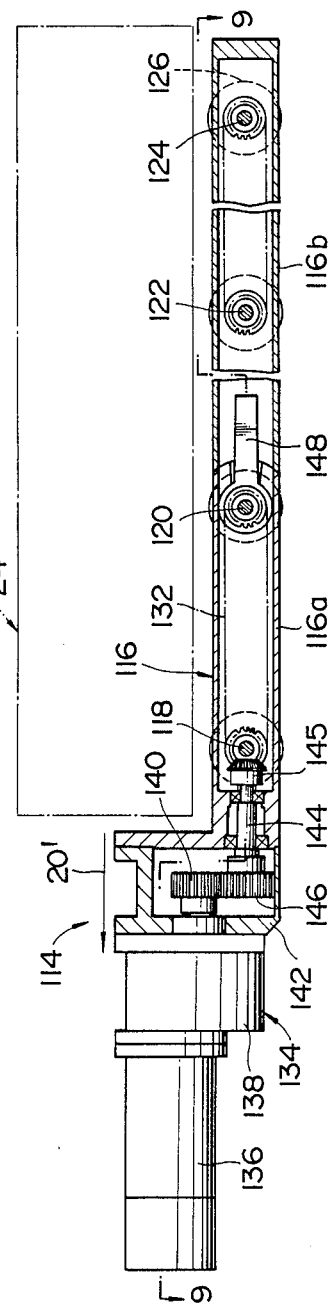
FIG. 8 is a fragmentary sectional view showing a truck of the carriage.
Figure 9:
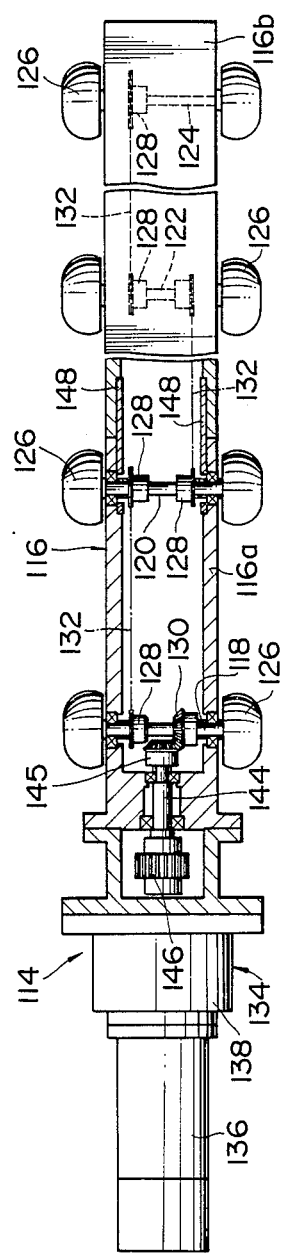
FIG. 9 is a sectional view taken along the line 9—9 in FIG. 8.

FIGS. 7 through 9 show an embodiment, in which the detecting device 24 shown in FIG. 2 is mounted on a self-propelled carriage 114 to move the detecting device 24 by the carriage 114, instead of moving the detecting device 24 with the wire. The carriage 114 comprises a truck or car body 116 extending back and forth and divided into the front and rear sections 116a,116b. In a plurality of spots spaced from each other in the longitudinal direction of the car body 116 there are rotatably supported shafts 118,120,122 and 124 extending through the car body 116 widthwise thereof respectively. The respective shafts 118 through 124 have wheels 126 mounted on both ends and sprockets 128 mounted on the central portions respectively. On the foremost shaft 118 there is mounted a bevel gear 130. The sprockets 128 of adjacent shafts are interconnected with a chin 132.

A drive mechanism 134 is mounted on the foremost section of the car body 116 without interrupting the partial beam 20'. The drive mechanism 134 is provided with a rotary source 136 such as a motor, a reduction gear 138 connected to the output shaft of the rotary source and a gear 140 mounted on the output shaft of the reduction gear. The drive mechanisms 134 is supported by a gear case 142 mounted on the car body. Also, a shaft 144 extending through the foremost section of the car body 116 in the axial direction is rotatably supported by the foremost section of the car body 116. Gears 145,146 meshing respectively with the gears 130,140 are mounted on the shaft 144.

The rotation of the rotary source 136 is transmitted to the shaft 118 through the reduction gear 138, gears 140,146, shaft 144 and bevel gears 145,130 and then transmitted from the shaft 118 to the other shafts 120,122 and 124 through the sprockets 128 and chains 132.

The front and rear sections 116a,116b of the car body 116 are pivotally interconnected with each other within a predetermined angular extent by the shaft 118 and a connecting member 148 supported pivotally by the shaft 118. Thus, even if the pipeline 18 is bent vertically on the way, the carriage 114 moves smoothly.

Figure 10:
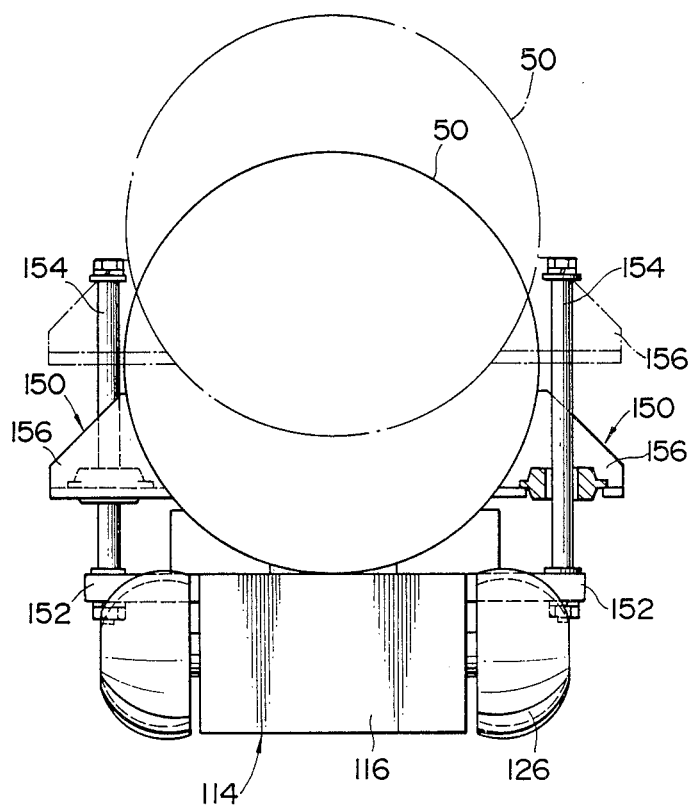
FIG. 10 is a view for explaining the positional relationship between the carriage and a light receiving plate.

The detecting device 24 is mounted on the truck 116 by a support mechanisms 150 so as to be movable in the vertical direction. As shown in FIGS. 7 and 10, the support mechanism 150 is provided with a pair of arms 152 extending from the truck 116 sideways, a guide rod 154 fixed to the arm 152 and extending from the arm upward and a bracket 156 supported vertically movably by the guide rod 154 and fixed to the casing 32 of the detecting device 24.

During the movement of the carriage 114, the slider 80 of the detecting device 24 is moved to the bed seat 70 and the the casing 32 contacts directly the truck 116, so that the elongate member 66 retreats to a position spaced from the pipeline 18. Thus, the elongate member does not interfere with the movement of carriage.

When the measuring process is done, the slider 80 of the detecting device 24 is moved to the wall 40, so that the elongate member 66 is pressed against the inner surface of the pipeline 18. When the elongate member 66 is pressed against the inner surface of the pipeline 18, the detecting device 24 ascends along the guide rod 154 of the support mechanism 150. By so doing, the axes of the casing 32 and light receiving plate 56 are aligned with the center of the pipeline 18 in the stopping position of the detecting device 24, i.e., in the measuring position.

Figure 11:
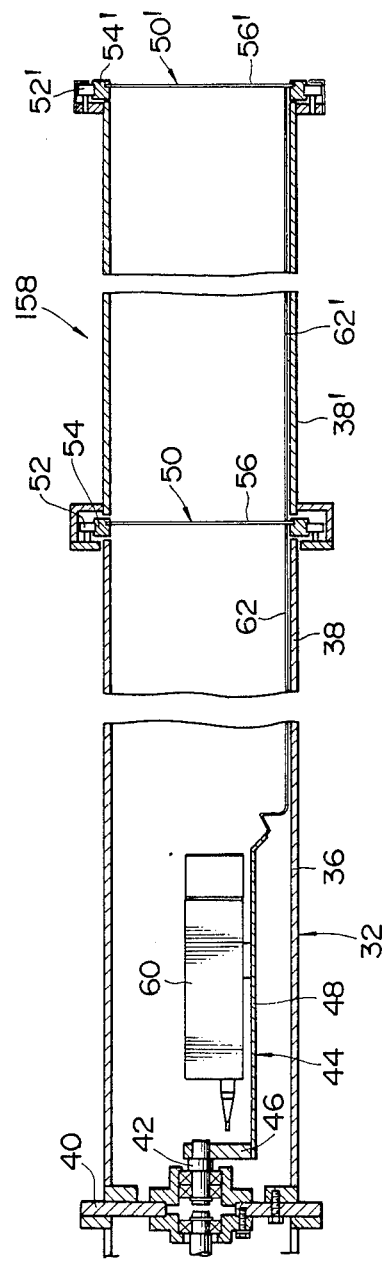
FIG. 11 is a longitudinal sectional view showing another embodiment of a detecting section of the detecting device.

A detecting device 158 shown in FIG. 11 is provided with a tubular body 38' mounted coaxially on the tubular body 38 so as in which the light receiving body 50 is disposed, a light receiving body 50' supported by the tubular body 38' so as to be rotatable about the axis of the casing 32 and a connecting piece 62' for connecting the light receiving body 50' to the light receiving body 50 or connecting piece 62. Also, as shown in FIG. 12, a television camera 60' for taking a picture of the light receiving body 50' is further installed on the frame 44 in addition to the television camera 60 for the light receiving body 50. The output signal of the television camera 60' is supplied to the processing device 26. The processing device 26 is further provided with a monitor for projecting the light receiving body 50' on the basis of the output signal of the television camera 60' in addition to the monitor corresponding to the television camera 60.

Similar to the light receiving body 50, the light receiving body 50' is provided with a ring 54' rotatably supported on portion 38' by a plurality of rollers 52' and a disk-like light receiving plate 56' fixed to the ring 54. As shown in FIG. 13(A), the light receiving plate 56 of the detecting device 158 has the right half made of a translucent material and the left half made f a transparent material, and a latticed pattern is drawn on the translucent right half. On the other hand, the light receiving plate 56', as shown in FIG. 13(B), has the left half made of the translucent material and the right half made of the transparent material, and the latticed pattern is drawn on the translucent left half.

The detecting device 158 uses first and second beams directed in parallel through portions spaced from each other in the horizontal direction of the pipeline 18. The first beam is directed so as to pass through the transparent right half of the light receiving plate 56' and then irradiate the translucent right half of the light receiving plate 56. On the other hand, the second beam is directed so as to pass through the translucent left half of the light receiving plate 56' and then irradiate the transparent left half of the light receiving plate 56.

According to the detecting device 158, when the pipeline 18 is neither eccentric nor slant in the measuring position, the first and second beams irradiate predetermined portions of the light receiving plates 56,56' However, when the pipeline 18 is eccentric, those portions of the light receiving plates 56, which are 56' irradiated by the first and second beams are displaced according to the eccentricity and eccentric direction of the pipeline 18. Thus, the eccentricity of the pipeline can be measured from the output signal of the television camera 60 or television camera 60'

Also, according to the detecting device 158, when the slant angle of the pipeline 18 differs from a predetermined slant angle in the measuring position, those portions of the light receiving plates 56,56' irradiated by the first and second beams are displaced according to a variation of the slant angle of the pipeline 18. Thus, the variation of the slant angle of the pipeline 18 can be measured from the output signals of the television cameras 60,60'.

Figure 15:
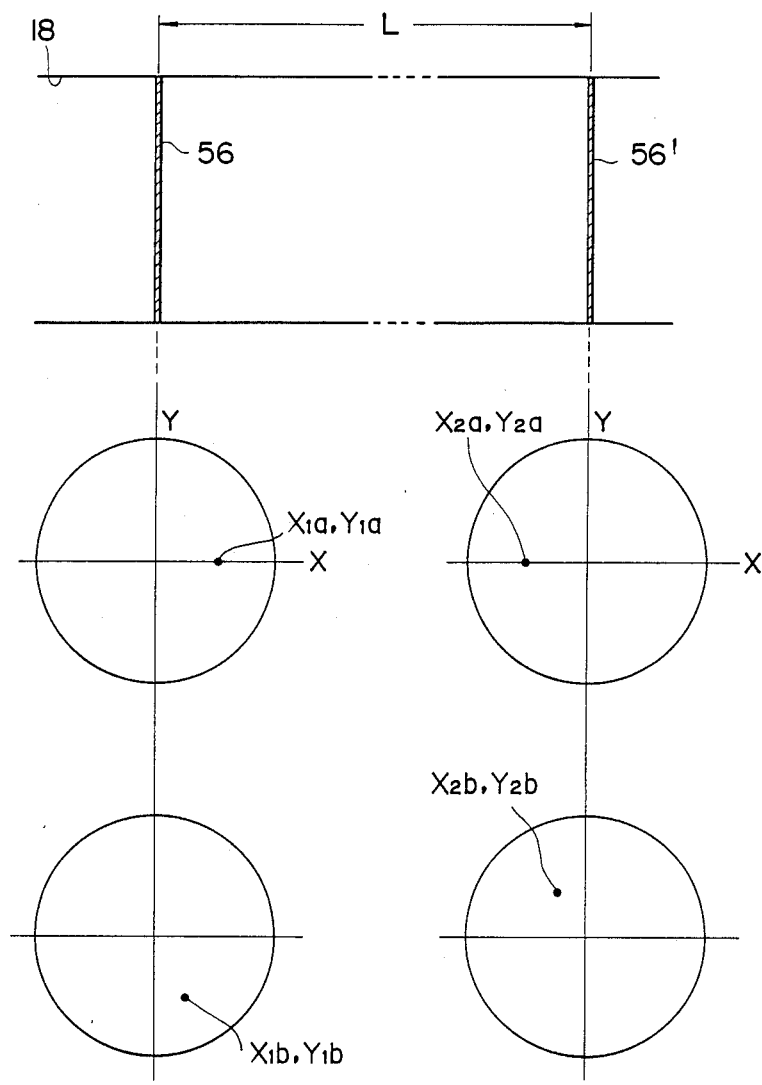
FIG. 15 is a view for explaining a method of calculating a variation in the slant angle of the pipeline.

This variation can be obtained as follows;

Assuming that, as shown in FIG. 15,

X1$a$ and Y1$a$ are coordinate values of that portion of the light receiving plate 56 which are irradiated by the first beam when the pipeline 18 is neither eccentric nor slant in the measuring position, X1$b$,Y1$b$ are coordinate values of that portion of the light receiving plate 56 which are irradiated by the first beam when the pipeline 18 is eccentric or slant in the measuring position, X2$a$,Y2$a$ are coordinate values of that portion of the light receiving plate 56 which are' irradiated by the second beam when the pipeline 18 is neither eccentric nor slant in the measuring position, X2$b$,Y2$b$ are coordinate values of that portion of the light receiving plate 56 which are' irradiated by the second beam when the pipeline 18 is eccentric or slant in the measuring position, L is the distance between the light receiving plates 56,56', $\theta x$ is the variation of the slant angle in a horizontal direction and $\theta y$ is the variation of the slant angle in a vertical direction, the variation of the slant angle of the pipeline can be obtained from the following formulas;

$$\tan \theta x = \{(|X1b| - |X1a|) + (|X2a| - |X2b|)\} \div L$$

$$\tan \theta y = \{(|Y1b| - |Y1a|) + (|Y2a| - |Y2b|)\} \div L$$

What is claimed is:

1. A method for inspecting a pipeline in order to determine eccentricity thereof, comprising the steps of:
    directing a beam from one end of the pipeline to the other;
    disposing a detecting means, which is provided with a light receiving body having a light receiving surface for receiving said beam and a television camera for taking a picture of the light receiving body, in said pipe so as to be movable along the axis of said pipeline;
    processing an output signal of said television camera while maintaining the position of said light receiving body to have a predetermined relationship to the inner surface of said pipeline; and
    determining whether or not said pipeline is eccentric on the basis of the result of said processing step.

2. A method for inspecting a pipeline as claimed in claim 1, wherein said detecting means is disposed so as to receive said beam at a predetermined portion of said light receiving surface.

3. A method for inspecting a pipeline as claimed in claim 1, wherein whether or not said pipeline is eccentric is determined based upon the coordinates of the beam receiving portion on said light receiving surface.

4. A method for inspecting a pipeline as claimed in claim 1, wherein said beam is directed from the center of said pipeline on one end to the center of the same on the other end, and the position of said light receiving body releasably maintained relative to said inner surface of said pipeline so that the center of said light receiving surface is spaced from the inner surface of said pipeline by a predetermined distance when the inspection is done.

5. An apparatus for inspecting a pipeline utilizing a beam directed from one end thereof to the other in order to determine eccentricity of said pipeline, comprising
    detecting means disposed in said pipeline so as to be movable along the axis of said pipeline and provided with a light receiving body having a light receiving surface for receiving said beam, a mechanism for releasably maintaining a position of said light receiving body relative to the inner surface of said pipeline so that the light receiving body has a predetermined positional relationship to the inner surface of said pipeline, and a television camera for taking a picture of said light receiving body; and
    means for processing an output signal of said television camera to determine whether or not said pipeline is eccentric.

6. An apparatus for inspecting a pipeline as claimed in claim 5, wherein said detecting means further includes a tubular casing disposed so as to extend along the axis of said pipeline, wherein said light receiving body, said maintaining mechanism and said television camera are supported by said casing, and wherein said maintaining mechanism is pressed against said inner surface of said pipeline to releasably maintain the position of said light receiving body so as to have a predetermined relationship to said inner surface of said pipeline.

7. An apparatus for inspecting a pipeline as claimed in claim 6, wherein said maintaining mechanism is provided with a plurality of members disposed around said casing and connected to said casing so that a position of each elongate member on a straight line extending radially with respect to said casing is variable and further comprising a drive mechanism for changing the positions of said members on the straight lines extending radially with respect to said casing.

8. An apparatus for inspecting a pipeline as claimed in claim 7, wherein each of said members is provided with an elongate member extending along the axis of the casing outside said casing and connected to said casing through a plurality of parallel links.

9. An apparatus for inspecting a pipeline as claimed in claim 6, wherein said detecting means is further provided with a frame disposed in said casing and supported by said casing so as to be rotatable about the axis of said casing, said television camera is supported by said frame, said light receiving body is supported by said casing so as to be rotatable about the axis of said casing and said frame and said light receiving body are interconnected with each other without changing their relative positions.

10. An apparatus for inspecting a pipeline as claimed in claim 5, further comprising a self-propelled carriage disposed in said pipeline so as to be movable along the axis of said pipeline, said self-propelled carriage having means for mounting said detecting means thereto.

* * * * *